(12) United States Patent
Beck et al.

(10) Patent No.: US 7,693,270 B2
(45) Date of Patent: Apr. 6, 2010

(54) METHOD AND NETWORK FOR PROVIDING SERVICE BLENDING TO A SUBSCRIBER

(75) Inventors: Andre Beck, Woodbridge, NJ (US); Markus Andreas Hofmann, Fair Haven, NJ (US); Kristin Freya Kocan, Warrenville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 729 days.

(21) Appl. No.: 11/357,144

(22) Filed: Feb. 21, 2006

(65) Prior Publication Data

US 2007/0140150 A1 Jun. 21, 2007

Related U.S. Application Data

(63) Continuation-in-part of application No. 11/300,418, filed on Dec. 15, 2005.

(51) Int. Cl.
- H04M 1/56 (2006.01)
- H04M 15/06 (2006.01)
- H04M 11/00 (2006.01)
- H04N 7/173 (2006.01)

(52) U.S. Cl. .............. 379/142.16; 379/93.23; 725/106

(58) Field of Classification Search ............ 379/352, 379/88.19–88.21, 373.01–376.02; 370/352; 725/106
See application file for complete search history.

(56) References Cited

U.S. PATENT DOCUMENTS

| 5,825,862 | A | 10/1998 | Voit et al. | |
|---|---|---|---|---|
| 2003/0055981 | A1* | 3/2003 | Requena et al. | 709/227 |
| 2003/0142802 | A1 | 7/2003 | Hong et al. | |
| 2003/0147417 | A1 | 8/2003 | Seo | 370/466 |
| 2003/0224795 | A1 | 12/2003 | Wilhoite et al. | |
| 2004/0120485 | A1* | 6/2004 | Basore et al. | 379/93.23 |
| 2004/0215787 | A1* | 10/2004 | Gibson et al. | 709/227 |
| 2004/0261115 | A1 | 12/2004 | Bartfeld | 725/106 |
| 2005/0074105 | A1* | 4/2005 | Corbett et al. | 379/142.16 |
| 2005/0255811 | A1* | 11/2005 | Allen et al. | 455/78 |
| 2006/0115062 | A1* | 6/2006 | Gonder et al. | 379/142.01 |

FOREIGN PATENT DOCUMENTS

WO 2007/070652 A 6/2007

OTHER PUBLICATIONS

International Search Report and Written Opinion dated Apr. 4, 2007.
International Search Report and Written Opinion dated Aug. 20, 2007.
Weldon: "IMS and IPTV, Perfect Together" Internet Citation, Jan. 17, 2006, XP002418650.

* cited by examiner

Primary Examiner—Fan Tsang
Assistant Examiner—Ibraham Sharifzada
(74) Attorney, Agent, or Firm—Harness, Dickey & Pierce

(57) ABSTRACT

A method and communication network for providing a subscriber with a blend of services of the communication network delivered to the subscriber through a telephone and services delivered to the subscriber through a TV delivery system in communication with the network. Upon receipt of a message from a calling party, a service broker function may be configured to execute service package information associated with services of the TV delivery system subscription to include obtaining and delivering caller ID information of the calling party. The service broker function may be configured to alter the message request to generate a modified message request in respect to information affecting alerting of the subscriber's phone. The modified message is sent to the subscriber's phone so that, while information of the calling party is displayed on the TV delivery system, alerting of the phone is modified.

15 Claims, 4 Drawing Sheets

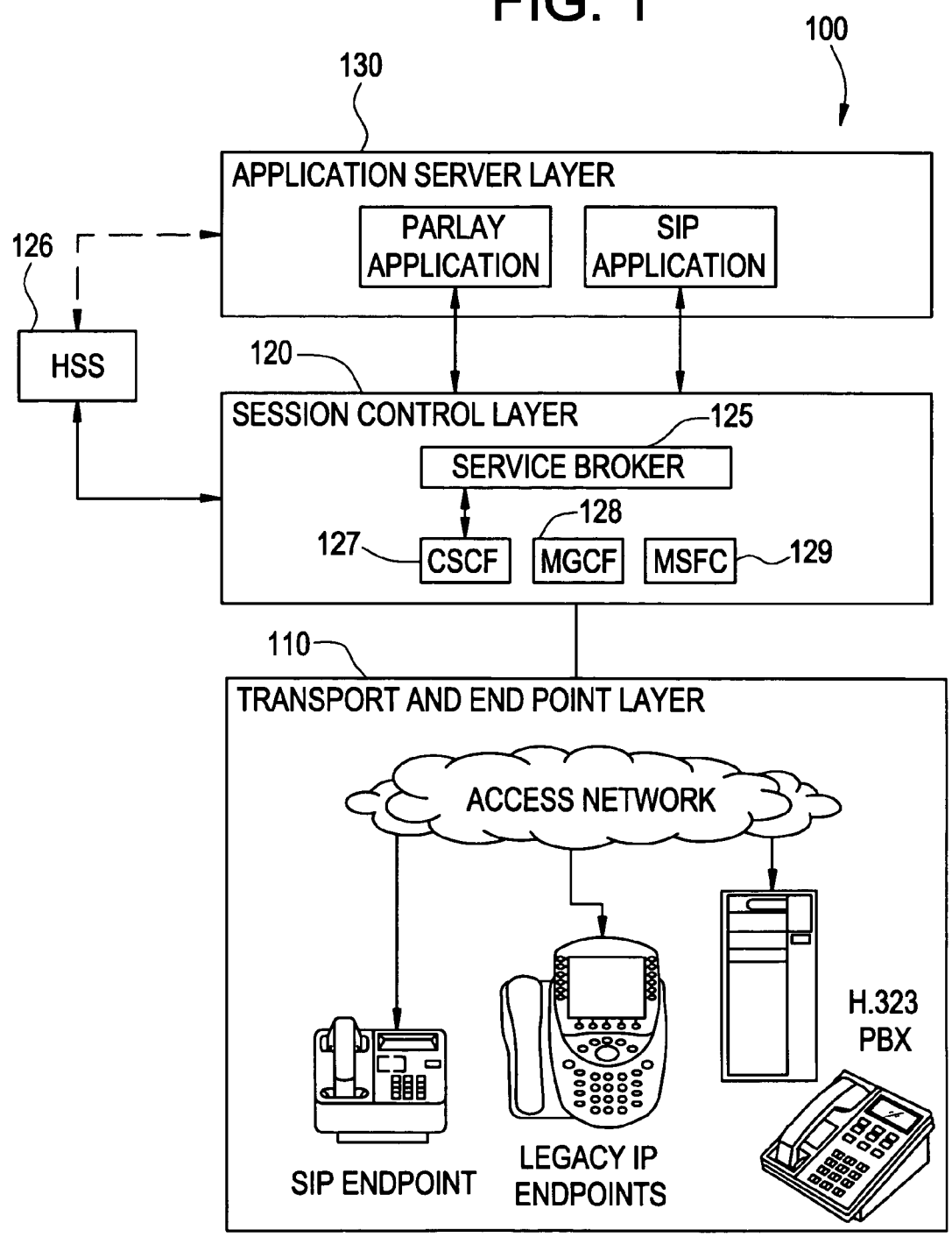

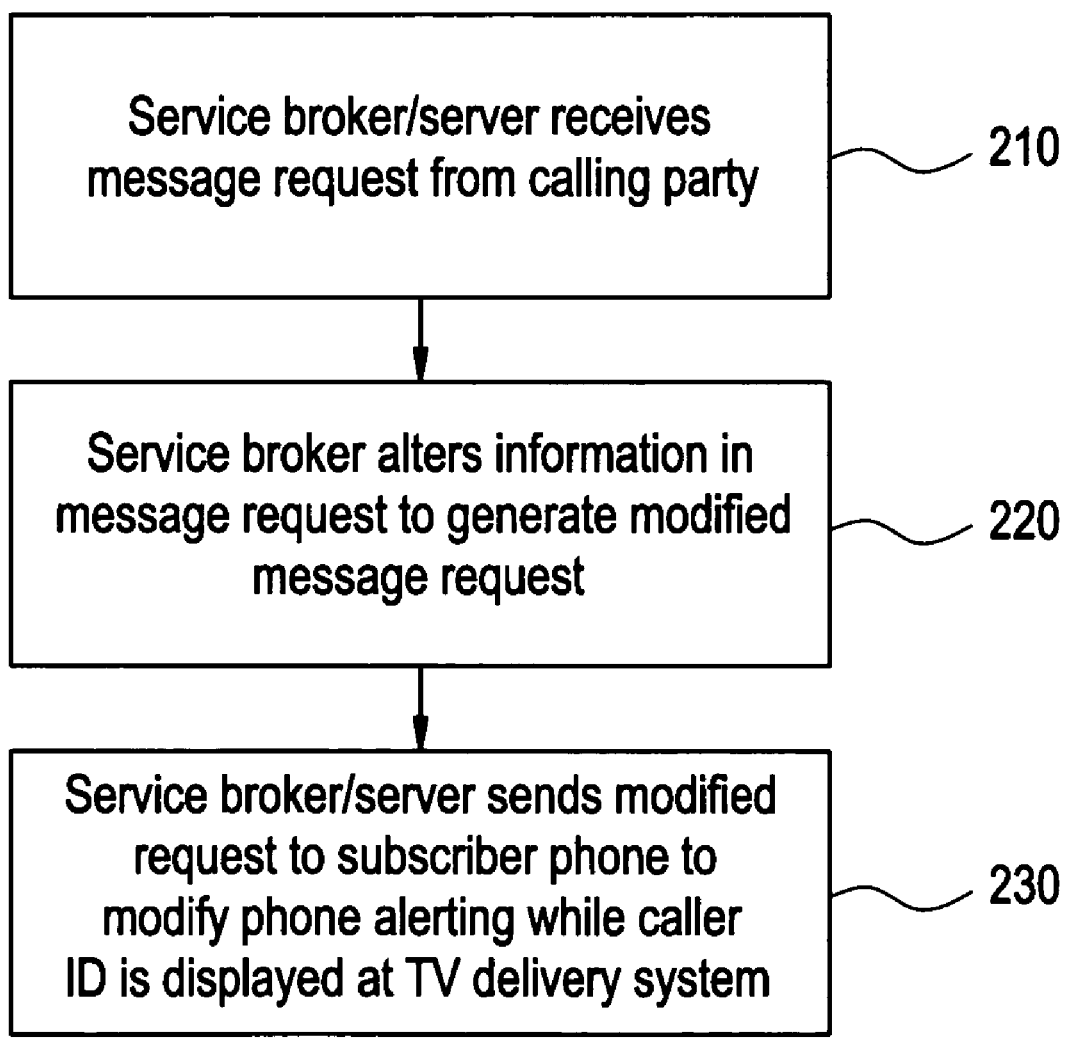

METHOD AND NETWORK FOR PROVIDING SERVICE BLENDING TO A SUBSCRIBER

PRIORITY STATEMENT

This application is a continuation-in-part of and claims domestic priority benefits under 35 U.S.C. §120 to co-pending U.S. patent application Ser. No. 11/300,418 to Markus A. Hofmann et al., filed Dec. 15, 2005 and entitled "Method and Network for Providing Service Blending to a Subscriber". The entire contents of the co-pending '418 application are hereby incorporated by reference herein.

BACKGROUND OF THE INVENTION

1. Field of the Invention

Exemplary embodiments of the present invention, in general, relate to a communication network and method of providing a subscriber with a blend of services of the communication network delivered to the subscriber through a telephone and services delivered to the subscriber through a TV delivery system in communication with the network, and to a method of processing an incoming call to the subscriber.

2. Description of the Related Art

The Internet Protocol (IP) Multi-Media Subsystem (IMS) is an IP multimedia and telephony core network defined by the Third Generation Partnership Project (3GPP and 3GPP2) standards and organizations based on Internet Engineering Task Force (IETF) Internet protocols. A 3GPP/IMS network is access independent as it supports IP to IP session over wire line IP, 802.11, 802.15, CDMA, packet data along with GSM/EDGE/UMTS and other packet data applications.

The 3GPP/IMS services architecture is a unified architecture that supports a wide range of services enabled by the flexibility of Session Initiation Protocol (SIP). SIP is a signalling protocol for Internet conferencing, telephony, event notification and instant messaging. SIP was developed within the IETF Multiparty Multimedia Session Control working group. SIP can also invite participants to already existing sessions, such as multicast conferences. Media can be added to (and removed from) an existing session. SIP transparently supports name mapping and redirection services, which supports personal mobility—users can maintain a single externally visible identifier regardless of their network location.

There is a desire to leverage investment in the IMS service infrastructure and to provide new service offerings by providing "blended" services to a subscriber of services of different platforms, such as a subscriber to a communication network and a TV delivery system. For example, service providers may desire to be able to provide blended services (e.g., phone, multicast, television/video, etc.) to a subscriber of a 3GPP/IMS network and another platform or service infrastructure such an Internet Protocol Television (IPTV). IPTV services typically include the ability to enable a user/viewer to display caller ID information, instant messages, e-mail or Short Message Service (SMS) on the TV.

SUMMARY OF THE INVENTION

Exemplary embodiments of the present invention are directed to a method and communication network for providing a subscriber with a blend of services of the communication network delivered to the subscriber through a telephone and services delivered to the subscriber through a TV delivery system in communication with the network. Upon receipt of a message from a calling party, a service broker function may be configured to execute service package information associated with services of the TV delivery system subscription to include obtaining and delivering caller ID information of the calling party. The service broker function may be configured to alter the message request to generate a modified message request in respect to information affecting alerting of the subscriber's phone. The modified message is sent to the subscriber's phone so that, while information of the calling party is displayed on the TV delivery system, alerting of the phone is modified.

Another example embodiment of the present invention is directed to a method of processing an incoming call to a subscriber of one or more services of a communication network for a phone of the subscriber and one or more services of a TV delivery system in communication with the network. In the method, a message request is received from a calling party which corresponds to the incoming call to the subscriber's phone. The call may be suspended in the network for a given duration so that ringing of the subscriber's phone due to the incoming call is suppressed. Caller identification information may be displayed on a display of the TV delivery system to enable the subscriber to accept or reject the call.

BRIEF DESCRIPTION OF THE DRAWINGS

Exemplary embodiments of the present invention will become more fully understood from the detailed description given herein below and the accompanying drawings, wherein like elements are represented by like reference numerals, which are given by way of illustration only and thus are not limitative of the exemplary embodiments of the present invention.

FIG. 1 is a block diagram of an IMS services architecture in accordance with an exemplary embodiment of the present invention.

FIG. 2 is a flow diagram for illustrating a method of providing blending of services to a subscriber in accordance with an exemplary embodiment of the present invention.

DETAILED DESCRIPTION OF THE EXEMPLARY EMBODIMENTS

Figure 3A:
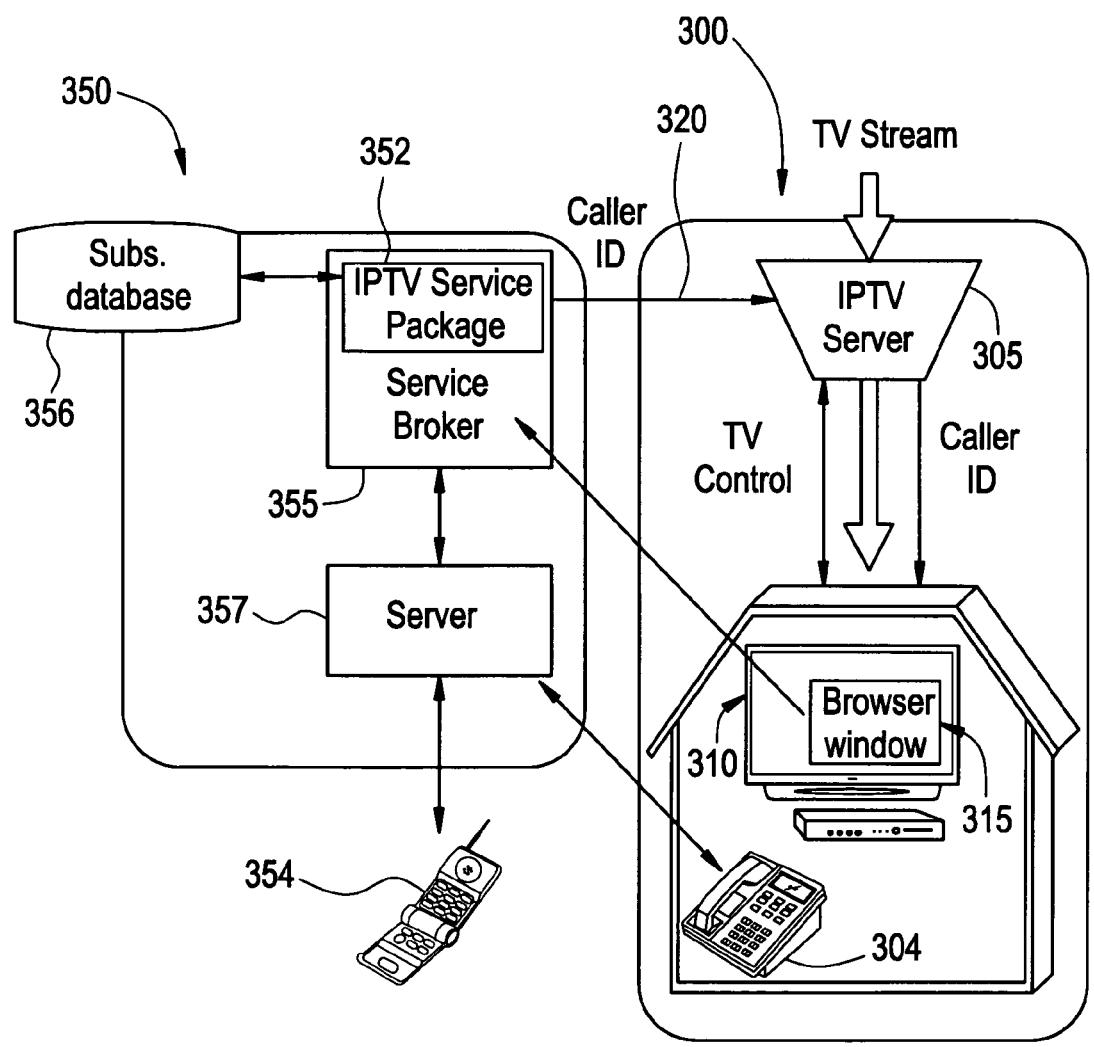
FIGS. 3A and 3B illustrate relationships between the service architectures of a communications network and a TV delivery system.

In accordance with the exemplary embodiments, service delivery architectures such as an IMS services architecture of a communication network, and another platform services architecture, such as the content streaming architecture of a TV delivery system such as an IPTV system, may be utilized in order to provide blended services to a subscriber. In another example embodiment, these service delivery architectures May be configured so as to process an incoming call to a subscriber of both the communication network and TV delivery system.

FIG. 1 is a block diagram of an IMS services architecture in accordance with an exemplary embodiment of the present invention. In order to provide context for the exemplary methodology and system for blending of services, an example IMS services architecture for an IMS communication network is described below.

As shown in FIG. 1, the IMS services architecture 100 of a communication network such as a 3GPP/IMS core network can support multiple application servers providing traditional telephony services and non-telephony services such as instant messaging, push-to-talk, video streaming, multimedia messaging, etc. The services architecture 100 is a collection of logical functions, which can be divided into three layers: a Transport and Endpoint Layer 110, a Session Control Layer 120 and an Application Server Layer 130.

Transport and Endpoint Layer

The transport and endpoint layer 110 initiates and terminates SIP signaling to set up sessions and provide bearer services such as conversion of voice from analog or digital formats to IP packets using Realtime Transport Protocol (RTP). This layer provides the media gateways for converting the Voice of internet Protocol (VoIP) bearer streams to PSTN TDM format. The media server provides many media related services including conferencing, playing announcements, collecting in-band signaling tones, speech recognition, speech synthesis, etc The media server resources are shared across all applications. Consequently, each application that requires playing announcements, or collecting digits, for example, can use a common server. These applications include voicemail, advanced 800, interactive VoiceXML (VXML) services, among others. The media servers can also support non-telephony functions such as replicating media for push-to-talk (PTT) service. By using a common pool of media servers across multiple services, service providers do not have to forecast and engineer media resources for each application.

Session Control Layer

The session control layer 120 contains the Call Session Control Function (CSCF) 127, which provides the registration of the endpoints and routing of the SIP signaling messages to the appropriate application server. The (CSCF) 127 is thus a proxy server which provides session control for subscribers accessing services within the IMS. The CSCF 127 may also be referred to as a SIP Server.

The CSCF 127 interworks with the transport and endpoint layer 110 to guarantee Quality of Service (QoS) across all services. The session control layer 120 may communicate with a user database such as a Home Subscriber Server (HSS) database 126 that maintains the unique service profile for each end user. HSS 126 is accessible by the session control layer 120 and also the application server layer 110 (dotted line) for user profile data and or subscribed to services, for example. The end user's service profile stores all of the user service information and preferences in a central location. This includes an end user's current registration information (i.e., IP address), roaming information, telephony services (i.e., call forwarding information), instant messaging service information (i.e., buddies list), voice mail box options (i.e., greetings), etc. By centralizing this information, applications can share information to create unified personal directories, multi-client type presence information and blended services. This centralized arrangement also greatly simplifies the administration of user data and insures consistent views of active subscribers across all services.

The session control layer 120 also includes a Media Gateway Control Function (MGCF) 128, which interworks the SIP signaling with the signaling used by the media gateway (i.e., H.248). The MGCF 128 manages the distribution of sessions across multiple media gateways. A Media Server Function Control (MSFC) 129 provides a similar function for the media servers.

Application Server Layer

The application server layer 130 contains the application servers, which provide the end-user service logic. The application server layer 130 may also communicate with HSS 126 to access user profile data. Example serves include parlay and SIP application servers. The IMS architecture and SIP signaling is flexible so as to support a variety of telephony and non-telephony application servers. For example, SIP standards have been developed for telephony services and instant messenger (IM) services.

Service Broker

Extensions to the IMS architecture to support a rich set of services are desired. Currently there are many VoIP endpoints that do not support SIP signaling. For example, IP-PBXs typically use H.323. Integrated Access Devices (IADs) that support VoIP over DSL often use MGCP. Consequently, to support these popular endpoints in an IMS network, it is desirable to interwork non-SIP signaling to SIP. New border signaling gateways have been proposed to provide this interworking.

Customers desire real time communications services to work together in a seamless fashion. This allows service providers to bundle and interwork services to provide new blended capabilities. For example, end users in a lengthy IM session may wish to spawn a voice session without the bother of looking up phone numbers and re-establishing a separate voice session. When an end user is engaged in a PTT session the incoming voice calls should invoke call waiting services.

Although the standard IMS service architecture can simultaneously support many different real time communication applications, additional service interworking or service brokering may be needed to provide these blended services. To allow more expansive feature interaction management, the IMS standards define a function in the sub-layer of the services layer between call/connection control and the services layer proper for feature interaction management. This function is termed "Service Coordination and Interaction Manager" (SCIM). The precise operation and capabilities of the SCIM are not defined in the standards, nor are the means by which it would be configured.

As a result, and in accordance with the exemplary embodiments, the example IMS services architecture 100 may include a service capabilities interaction manager (SCIM), referred to herein as a service broker 125 (or service broker function) that can share application state and status information between applications. The service broker 125 resides at the session control layer 120 and has corresponding interfaces into the interworking applications. The service broker 125 thus provides critical functionality such as integrating multiple applications into meaningful service offerings, allowing participating applications to be unaware of each other, and providing programmability with an application programming interface (API) for combining services.

For a more detailed description of the internal make-up and functionality of the service broker 125, reference may be made to co-pending and commonly assigned U.S. patent application Ser. No. 11/231,166 to Kocan et al., filed Sep. 20, 2005 and entitled, "ENHANCED SYSTEM FOR CONTROLLING SERVICE INTERACTION AND FOR PROVIDING BLENDING OF SERVICES", the entire contents of which are hereby incorporated by reference herein.

As the IMS architecture is equally suitable for wireless, wireline and converged networks, the service broker 125 is fully consistent with this aspect of the IMS architecture as it is inherently endpoint/access neutral. The service broker 125 manages the integration and coordination of services to control service interaction and/or to provide enriched end-user experiences. Further, service broker 125 accommodates users who can span different endpoints, such as analog, softphones, or wireless phones, and can customize service presentation based on the user's endpoint capabilities, such as voice only, voice/data, or voice/data/multimedia. The service broker 125 can save and use variable user data and session context data to achieve multi-session awareness and manage simultaneous and sequential context-sensitive interactions.

Thus, in addition to the "service blending" capability, the service broker 125 can be used to share network services such as media servers across multiple applications by intercepting their commands and adapting them to a selected media server command interface, although other components in the IMS architecture could provide such sharing. Further, the service broker 125 may, in conjunction with other systems in the maintenance infrastructure, bring about the consolidation of information for billing and operations support systems and an abstracted view to the other elements in the communication network.

FIG. 2 is a flow diagram for illustrating a method of providing blending of services to a subscriber in accordance with an exemplary embodiment of the present invention. In general and with reference to FIG. 2, a subscriber of services provided by a communication network such as a 3GPP/IMS and TV delivery system such as an IPTV may utilize services architectures of these two platforms in order to take advantage of a blending of services. Accordingly in FIG. 2, in the example method (200) the subscriber's communication network receives a message request (210) from a calling party. In an example, the network is a 3GPP/IMS network and the message request is a SIP INVITE message from the calling party.

SIP is based on an HTTP-like request/response transaction model. Each transaction consists of a request that invokes a particular method, or function, on the server and at least one response. In an example, a transaction may begin with "Alice's" softphone (a softphone is a multi-media application that works in association with VoIP technology enabling the user to make calls direct from their PC or laptop) sending a message request (SIP-INVITE) addressed to "Bob"'s uniform resource identifier (URI). An INVITE request message (SIP-INVITE) is an example of a SIP method that specifies the action that the requester (Alice) wants the server (Bob) to take.

The SIP-INVITE contains a number of header fields, which are named attributes that provide additional information about a message. The header fields present in a SIP-INVITE may include at least a unique identifier for the call, the destination address, Alice's address, and information about the type of session that Alice wishes to establish with Bob.

Accordingly, the message request may be directly received by a service broker function in the communication network. In an example, the service broker 125 in the session control layer 120 may receive the message request. In another example a server in the communication network receives the message request from the calling party and directs the message request to a service broker function in the 3GPP/IMS network. For example, this may be a SIP proxy server such as the CSCF 127 in FIG. 1.

As the subscriber has subscribed to a blended service including the display of caller ID service on the TV delivery system, the service broker function, in addition to executing service package information based on the message request to provide caller ID information to the TV delivery system, alters or modifies information (220) in the message request, and sends (230) (either directly or via a proxy server) the modified message request to a phone of the subscriber so that alerting of the subscriber's phone is modified while caller ID information of the calling party is displayed on the subscriber's TV delivery system. If the message request is embodied as a SIP-INVITE, the service broker function has the ability to modify an "Alert Info" header field in the SIP-INVITE header so as to change the alerting (ringing, tones, visual indication or otherwise) of the subscriber's phone. In an example where the service broker function sets the Alert Info header field to "0", alerting on the subscriber's phone can be suppressed while the caller ID information is being displayed on the subscriber's TV delivery system, so as not to interfere with the sound of a program being viewed by the subscriber.

Accordingly, the service broker function such as service broker 125 serves as a SCIM in the communications network and provides the capability to blend services utilizing other service delivery architectures, such as that of a TV delivery system. As the service broker 125 is a programmable element and has an API, two example scenarios described with respect to the corresponding relationships between different service architectures, in order to convey the range of capabilities of the service broker 125 and its potential to enrich end-user experience.

Figure 3B:
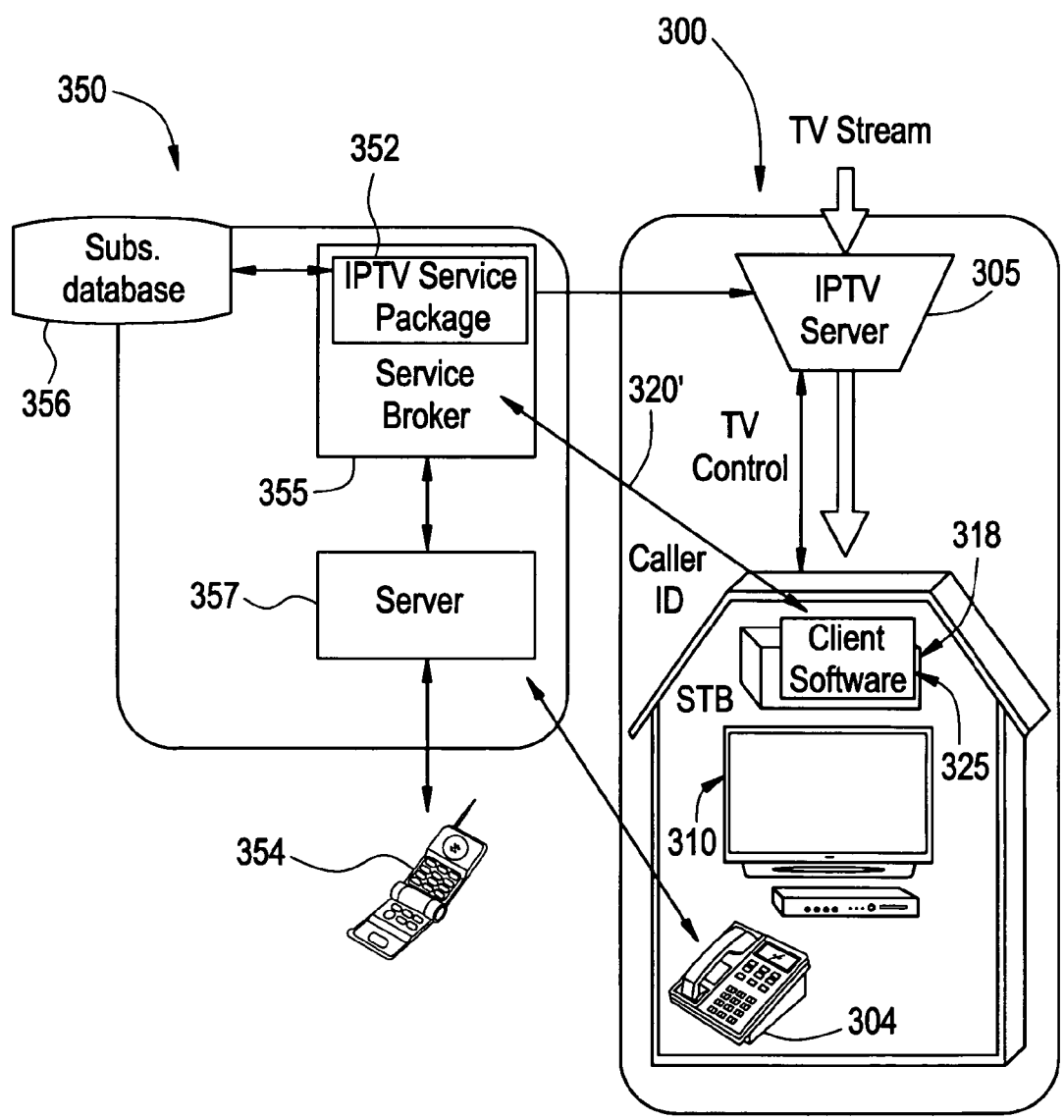

FIGS. 3A and 3B illustrate relationships between the service architectures of a communications network and a TV delivery system. In this example, the wireless communications network may be a 3GPP/IMS core network, and the TV delivery system may be an IPTV system, it being understood that the example methodology may be applied to other platforms besides IPTV for the blending of services. In each of FIGS. 3A and 3B, there is shown a streaming architecture part 300 of an IPTV delivery system and a session control layer of IMS 350 of a communication network.

As discussed above in FIG. 1, the session control layer of IMS 350 includes a service broker 355 in communication with server 357, which may be a SIP server (CSCF 127) or other proxy server, for example. The service broker 355 is configured to execute an IPTV service package 352 based on the services the subscriber has subscribed to, as reflected in a subscriber database 356. The subscriber database 356 may be a Home Subscriber Server (HSS), which may be several physical databases. This depends on the number of subscribers and the extent of the services which need to be supported. The HSS holds variables and identities for the support, establishment and maintenance of calls and sessions made by subscribers. The server 357 and/or service broker 355 may have interfaces to endpoints such as the subscriber's handset 304, which may be a WiFi/GSM handset registered with the IMS, and the subscriber's cell phone 354.

The content streaming architecture 300 on the IPTV side includes an IPTV server 305 which may process TV stream data for display at IPTV 310 and communicates with a subscriber input device (not shown), such as a remote control or browser interface, to process TV control data. The IPTV system may or may not support an interface between the IPTV server 305 and the service broker 355 for accepting caller ID data for display on IPTV 310.

Accordingly, an overview of the relationships between architectures having been explained, two scenarios are described to illustrate the range of capabilities of the service broker and its potential to enrich end-user experience. These scenarios involve two subscribers, Alice and Bob. Alice has subscribed to an offer that provides caller ID with optional "Silent Alerting" with her IPTV service. Bob subscribes to VoIP, but has an independent IPTV delivery system that uses a Set Top Box that is able to support a window-like environment. Bob subscribes to an offer that provides caller ID with optional "Silent Alerting" and the ability to control call disposition from the TV remote control device.

Caller ID and Modified Alerting with IPTV—Scenario 1

In this scenario, Alice's IPTV delivery system supports an interface to the communication system or network (e.g., IMS 350) that accepts caller ID and displays it on the user's (Alice's) TV. Furthermore, the IPTV Set Top Box (not shown in FIG. 3A) supports an application such as a browser capability (see browser window 315), whereby the user can click on a link as desired. The IMS 350 includes the service broker 355, which is able to provide originating and terminating service brokering. The service broker 355 provides the caller ID information to an IPTV application at IPTV server 305 when terminating calls to Alice's home phone 304 (which supports SIP and may also be referred to as a SIP phone) and when terminating calls to Alice's WiFi/GSM handset (mobile phone) 354 (i.e., cell phone) when it is registered in the IMS 350. The service broker 355 is able to modify or suppress normal alerting (e.g., ringing) in these phones by modifying the Alert Info header field in the SIP INVITE that is sent to the terminating devices. The scenario is described in more detail below with reference to FIG. 3A. As an alternative to completely suppressing alerting, the Alert Info header may be set to result in a "ping" or other less-intrusive alert.

Alice is relaxing and watching TV. Calls come in, but Alice is able to see who the calls are from on the TV set since she subscribes to a caller ID service. She is also able to activate a modified alerting feature, which in this example may be called "Silent Alerting", which prevents her phone(s) from alerting. She can even see those who are trying to reach her on her GSM/WiFi cell phone 354, since when she is at home it is registered in the IMS 350.

Alice turns on her IPTV 310 and selects a program from the IPTV program guide provided via the STB (not shown in FIG. 3A). A call comes into the IMS 350 for Alice's home phone 304. Since Alice is subscribed to a blended service, the server 357 directs the SIP INVITE message to the service broker 355.

If not cached, the service broker 355 retrieves Alice's terminating service package information from subscriber database 356 (such as an HSS) and begins to execute the IPTV service package 352. If the calling name is not encapsulated in the SIP INVITE message (as it could be for a call coming in from the PSTN), the service broker 355 may query a calling name web server (nor shown) to obtain this information.

The service broker 355 sends the SIP INVITE message to Alice's home phone 304 via the server 357, and sends the calling name information (caller ID information 320) to the IPTV application at IPTV server 305 on its proscribed interface. Alternatively, if no server 357 is present, the service broker 355 could be configured to receive this SIP INVITE message directly. In an example, and assuming the interface allows additional text, the service broker 355 may include an invitation to activate Silent Alerting.

The phone 304 rings and Alice simultaneously sees the caller ID on a display of the IPTV 310, along with the invitation to activate Silent Alerting. Since the program is very interesting and the call not urgent, Alice allows the phone 304 to ring until it is diverted to voice mail. Since the ringing was distracting, she brings up her on-screen browser window 315 and clicks the link in her favorites to activate Silent Alerting. It should be noted that the invitation is not required, as Silent Alerting could also have been set prior to the beginning of the program or as a default option.

Clicking the link causes an HTTP request to be sent to the service broker 355, which sends a web page where Alice can select a deactivation time or let a default deactivation (such as 2 hours) be in effect. Alice selects her desired deactivation time. A send click on the window 315 sends the HTTP request with this information to the service broker 355. The service broker 355 inputs appropriate information into Alice's user data on the subscriber database 356 to be used for future calls.

Another call comes into the IMS for Alice's home phone 304 and the server 357 directs the SIP INVITE message to the service broker 355. The service broker 355 retrieves Alice's terminating service package information from subscriber database 356, which now indicates that Silent Alerting is active, and begins to execute the service package 352. If the calling name is not encapsulated in the SIP INVITE message, the service broker 355 queries a calling name web server to obtain this information.

Since Silent Alerting is active, the service broker 355 sets the Alert-Info in the SIP INVITE message to "0" to alter the field. Then the service broker 355 sends the modified SIP INVITE message to Alice's home phone via the server 357 (or directly if no server 357 present), and sends the caller ID information 320 to the IPTV application at server 305 on its proscribed interface.

Alice sees the caller ID on the IPTV 310, but the phone 304 does not ring since Alice's phone 304 received the modified SIP INVITE and interprets the Alert-Info set to "0" as indicating no alerting. The call is urgent, so Alice picks up the phone 304 and answers the call.

Another call comes into the IMS 350 for Alice, but this time it is for her mobile (GSM/WiFi) phone 354. The call came to the IMS 350 since Alice is at home with her mobile phone 354 and it had registered with the IMS. The server 357 directs the SIP INVITE message to the service broker 355. Alternatively, if no server 357 is present, the service broker 355 could be configured to receive this SIP INVITE message directly.

As previously described, the service broker 355 retrieves Alice's terminating service package information from the subscriber database 356, which now indicates that Silent Alerting is active, and begins to execute the service package 352. As previously discussed, if the calling name is not encapsulated in the SIP INVITE, the service broker 355 may query a calling name web server to obtain this information.

Since Silent Alerting is active, the service broker 355 sets the Alert Info in the header field of the SIP INVITE to "0". Then the service broker 355 sends the modified SIP INVITE to Alice's mobile phone 354 via the server 357, and sends the caller ID information 320 to the IPTV application of server 305 on its proscribed interface. Assuming the interface allows additional text, the service broker 355 includes an indication that it is Alice's mobile phone 354 that is being called.

Alice sees the caller ID on the IPTV 310 along with the indication that it is Alice's mobile phone 354 that is being called, but the phone 354 does not ring since the phone 354 received the modified SIP INVITE and interprets the Alert-Info set to "0" as indicating no alerting. The call is urgent, so Alice picks up the mobile phone 354 and answers the call. For some GSM/WiFi roaming architectures, and in another example, the home phone 304 may also receive the modified SIP-INVITE message when the mobile 354 is registered in the IMS 350 and present at home.

Scenario 1 thus illustrates a blended service of TV caller ID with modified alerting (silent alerting) which takes advantage of the SIP Alert-info header. In this example scenario the SIP VoIP is designed to support and correctly interpret the Alert-Info setting, and the service broker 355 alters the Alert-Info header based on the information it obtains from the user over its HTTP interface. A further feature of this blended service is to provide caller ID and silent alerting for calls to the mobile phone 354. This is possible with GSM/WiFi Roaming and having the service broker 355 send the indication that the call is for the mobile phone 354.

As described with regard to FIG. 3A, both an IMS architecture for communication/session services and an IPTV content streaming architecture participated in this blended service. The IP access (utilizing DSL) is shared by both architectures. The service broker 355 plays the role of the SCIM and serves to meld the two service architectures by sending event data from the IMS 350 to the TV system 300. The service broker 355 is thus configured to receive a specific activation request from a user and to modify SIP messages based on specific application blending logic (including the activation information).

Caller ID and Modified Alerting with IPTV—Scenario 2

Referring to FIG. 3B, in this case the TV delivery system 300 does not support an interface to the communication system (IMS 350) for caller ID. However, a Set Top Box 320 is used that has a window-like environment that can run an application (client software 325) that is able to set a focus window to receive events from the TV remote control (e.g., the events may map to keystroke events). The service broker 355 in the IMS 350 of the network is able to communicate with the client software 325 in the STB 318 and handle incoming SIP INVITE messages, depending on TV remote control events. The scenario is described in more detail below with reference to FIG. 3B.

Bob is relaxing and watching TV. Calls come in, but Bob is able to see who the calls are from on the IPTV set 310. He is also able to activate a modified alerting feature, which in this example may be called "Silent Alerting", which prevents his phone(s) from alerting, and he is able to either send calls to voice mail or even stop the calls from his TV remote control (not shown in FIG. 3B).

Bob turns on his IPTV 310 and selects a program from the IPTV program guide provided via the STB 318. A call comes into the IMS 350 for Bob's home phone 304. Since Bob is subscribed to a blended service, the server 357 directs the SIP INVITE to the service broker 355. Alternatively, the service broker 355 could be configured to receive this SIP INVITE message directly. The service broker 355 retrieves Bob's terminating service package information from the subscriber database 356 (if not cached) and begins to execute the service package 352. If the calling name is not encapsulated in the SIP INVITE (as it could be for a call coming in from the PSTN), the service broker 355 queries a calling name web server to obtain this information.

The service broker 355 sends the SIP INVITE message to Bob's home phone 304 via the server 357, and sends caller ID information 320' to the client software application 325 on Bob's STB 318. The phone 304 rings and Bob simultaneously sees the caller ID on a display of the IPTV 310, along with clickable (via the TV remote control) links to reject the call, send the call to voice mail and activate Silent Alerting for a given duration.

Since the program is very interesting and the call was not urgent, Bob clicks the link to send the call to voice mail. Since the ringing was distracting, he also clicks to activate Silent Alerting. Clicking the links caused HTTP requests to be sent to the service broker 355. The service broker 355 sends the SIP INVITE message to the voice messaging system, and then pushes appropriate information into Bob's user data on the subscriber database 356 to be used for future calls.

Another call comes into the IMS for Bob's home phone 304 and the server 357 directs the SIP INVITE message to the service broker 355. Alternatively, the service broker 355 could be configured to receive this SIP INVITE message directly. The service broker 355 retrieves Bob's terminating service package information from the subscriber database 356, which now indicates that Silent Alerting is active, and begins to execute the service package 352. If the calling name is not encapsulated in the SIP INVITE, the service broker 355 queries a calling name web server to obtain this information.

Since Silent Alerting is active, the service broker 355 sets the Alert-Info in the SIP INVITE to "0". Then the service broker 355 sends the modified SIP INVITE message to Bob's home phone 304 via the server 357 (or directly if no server 357 present), and sends the caller ID information 320' to the client software application 325 on Bob's STB 318.

Bob sees the caller ID on the IPTV 310, but the phone 304 does not ring since Bob's phone 304 received the modified SIP INVITE and interprets the Alert-Info set to "0" as indicating no alerting. The call is urgent, so Bob picks up the phone 304 and answers the call.

In scenario 2, the TV caller ID service allows independence of the IPTV delivery system, that is, so long as the IPTV client software application 325 can operate in a windows-like environment and the STB 318 supports a windows-like environment. Added capabilities with this version could be based on the client software 325 picking up the TV remote events and sending HTTP messages to the service broker 355 to affect call treatment. Further, more sophisticated capabilities may be possible if the client software 325 on the STB 318 would provide an API so that the software client interacting with the service broker 355 can have more complete information. An example might be indicating what program is being viewed. In such a case, a parental alert and control capability (such as described for incoming and outgoing calls) could be implemented for certain programs.

Caller ID and Ring Suppression with IPTV—Scenario 3

A third scenario is somewhat similar to scenario 2 but provides the ability for a user (subscriber) of an network such as an IMS and an IPTV delivery system to actually prevent the initial ringing of an incoming call, whether or not the subscriber subscribes to the Silent Alerting feature. In general, the user may use his/her television remote control to decide what to do with an incoming call. When a call comes in, the phone does not immediately ring. This is because the incoming call may be suspended in the network for a given amount of time to allow the user to make a decision. The call suspension would be done automatically as part of a given subscribed-to service. For example, in IMS 350 the service broker 355 may be configured to suspend the forwarding of the SIP message to the next hop in order to suspend the call.

Instead, the user may be first alerted to the incoming call when the caller's name and number is displayed on the user's television screen. In an example, a menu may be presented to the user to enable him/her to determine or select how to treat the incoming call. In one example, the user may choose to ignore the call. In this case, the Caller ID information is removed from the display on IPTV 310 and a 'no answer' treatment is applied to the call. Of course, the user may desire to answer the call. In this case, only then does the phone begin to ring. The Caller ID information may remain on the television display for the duration of the ringing.

Referring again to FIG. 3B, in this case the TV delivery system 300 does not support an interface to the communication system (IMS 350) for caller ID. However, the Set Top Box 320, which has a window-like environment that can run an application (client software 325) to set a focus window to receive events from the TV remote control (e.g., the events may map to keystroke events), may be used, as described in scenario 2. The service broker 355 in the IMS 350 of the network is able to communicate with the client software 325 in the STB 318 and handle incoming SIP INVITE messages, depending on TV remote control events. This third scenario is described in more detail below with reference to FIG. 3B.

Bob is relaxing and watching TV. Calls come in, but Bob is able to see who the calls are from on the IPTV 310. From his TV remote control (not shown in FIG. 3B) he is able to either send calls to voice mail or choose to answer the incoming call. In this scenario, Bob may or may not subscribe to Silent Alerting.

Bob turns on his IPTV 310 and selects a program from the IPTV program guide provided via the STB 318. A call comes into the IMS 350 for Bob's home phone 304. Since Bob is subscribed to a blended service, the server 357 directs the SIP INVITE message (request) to the service broker 355. Alternatively, the service broker 355 could be configured to receive this SIP INVITE message directly. The service broker 355 retrieves Bob's terminating service package information from the subscriber database 356 (if not cached) and begins to execute the service package 352. If the calling name is not encapsulated in the SIP INVITE (as it could be for a call coming in from the PSTN), the service broker 355 queries a calling name web server to obtain this information.

The service broker 355 sends the caller ID information 320' to the client software application 325 on Bob's STB 318. The client software application 325, if designed together with the service package 352, could have an interface to the STB 318 to provide a means for the service package 352 to control the caller ID display on the user's TV screen, as well as a means to receive the user's response (i.e. to accept or ignore the call). Alternatively, the client software application 325 could have a published interface that the service package 352 is designed to accommodate. This may be an interface designed by a party other than the party or vendor who provides service package 352. For example, the IPTV 310 vendor or STB 318 vendor could have designed and developed the software running on the STB 318.

Bob sees the Caller ID information—number/address and name—displayed on the IPTV 310 along with clickable (via the TV remote) function buttons to accept the call or send the call to voice mail (i.e., 'ignore' the call). Note that at this point Bob's home phone 304 has not yet begun to ring. Rather, the call has been suspended in the IMS 350 for a specified duration while Bob makes his decision.

Since the program is very interesting and the call was not urgent, Bob clicks a given function button (or link) to send the call to voice mail. The phone 304 thus never rings. Clicking the function button (or link) causes an HTTP request to be sent to the service broker 355. The service broker 355 sends the SIP INVITE message to the voice messaging system, and then pushes appropriate information into Bob's user data on the subscriber database 356 to be used for future calls.

Another call comes into the IMS 350 for Bob's home phone 304 and the server 357 directs the SIP INVITE message to the service broker 355. Alternatively, the service broker 355 could be configured to receive this SIP INVITE message directly. The service broker 355 retrieves Bob's terminating service package information from the subscriber database 356. As before, if the calling name is not encapsulated in the SIP INVITE message, the service broker 355 queries a calling name web server to obtain this information. The service broker 355 sends the caller ID information 320' to the client software application 325 on Bob's STB 318.

Bob sees the caller ID on the TV 310, but the phone 304 still has not begun to ring, as the call has been suspended for a given duration in the IMS 350. This time the call is urgent, so Bob clicks a function button on his remote control to accept the call. When receiving the HTTP request indicating that Bob wants to accept the call, the service broker 355 proxies the SIP INVITE toward Bob's phone 304 via the server 357. If Bob subscribes to Silent Alerting and Bob has Silent Alerting activated, the Service Broker sets the Alert-Info in the SIP INVITE to "0". In other words, should Bob elect to accept the call, then the silent alerting function as described in FIG. 2 and as outlined in scenarios 1 and 2 may be implemented to alter the SIP INVITE message header, so as to modify the phone alerting, for example.

Once the SIP INVITE message gets to Bob's phone 304, if the Alert-Info header is not "0", then at that point the phone 304 will start ringing. The Caller ID information may remain on the television display for the duration of the ringing. Otherwise, the phone 304 will not ring. The call is urgent, so Bob picks up the phone 304 and answers the call.

Accordingly, by suspending the call in the IMS 350 for a given period of time, the user who subscribes to a blended service may be able to decide whether or not to receive a call, upon only then does the ringing commence, or to send the call directly to voice mail. In the latter case, the phone never rings. Scenario 3 thus may provide a further option for those who do not subscribe to Silent Alerting. Although scenario 3 has been described with reference to FIG. 3B, the call suspension with ring suppression described therein could also be applicable to an IPTV delivery system that supports an interface to the communication system or network (e.g., IMS 350) which accepts caller ID and displays it on the user's IPTV, as shown in FIG. 3A. Accordingly, scenario 3 is applicable to an IPTV Set Top Box (not shown in FIG. 3A) that supports an application such as a browser capability (see browser window 315), whereby the user can click on a link as desired to reject or accept the call. Thus, as the interface to the IPTV server may be configured to provide the appropriate call handling options, i.e., to accept or ignore the call, this feature may also be implemented using the system in FIG. 3A.

The exemplary embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

What is claimed is:

1. A method of providing a subscriber with a blend of one or more services of a communication network delivered to the subscriber through a telephone and one or more services delivered to the subscriber through a TV delivery system in communication with the network, comprising: receiving a message request from a calling party, altering the message request in respect to information affecting alerting of the subscriber's phone, based on data of said subscriber stored in a database, so as to generate a modified message request, and sending the modified message request to the subscriber's phone so that, while information of the calling party is displayed on the TV delivery system, alerting of the phone is modified.

2. The method of claim 1, further comprising executing service package information associated with the TV delivery system, upon receipt of the message request.

3. The method of claim 2, wherein executing further includes:
  obtaining caller ID information of the calling party, and
  sending the caller ID information to an application of the TV delivery system to display the calling party's name and number information.

4. The method of claim 3, further comprising sending an invitation to activate said alerting with the caller ID information to the TV delivery system, wherein the subscriber selectively activates the alerting via one of an on-screen browser and a remote control of the TV delivery system.

5. The method of claim 1, wherein the message request is a SIP INVITE message, and altering further includes altering a header field of the SIP INVITE message.

6. The method of claim 5, wherein the header field contains alert information specifying alerting or ringing tones for the subscriber's phone, and altering further includes setting the alert information header field in the SIP INVITE to a given value to modify a presently selected ring tone or to suppress the ring tone on the subscriber's phone.

7. The method of claim 5, wherein the header field contains alert information specifying alerting or ringing tones for the subscriber's phone, and altering further includes setting the alert information header field in the SIP INVITE to '0' to suppress alerting of the subscriber's phone.

8. A communication network for providing a subscriber with a blend of one or more services of the network delivered to the subscriber through a telephone and one or more services delivered to the subscriber through a TV delivery system in communication with the network, comprising: a server for receiving a message request from a calling party and directing the message request, and a service broker function in communication with the server for sharing information between applications of the network and TV delivery system, wherein the server directs the message request to the service broker function, and the service broker function executes, upon receipt of the message request, service package information associated with services of the TV delivery system subscription to include obtaining and delivering caller ID information of the calling party, alters information in the message request to generate a modified message request that is sent via the server to the phone of the subscriber to modify alerting of the subscriber's phone, based on data of said subscriber stored in a database, and sends the caller ID information of the calling party to an application of the TV delivery system for display.

9. The network of claim 8, wherein
the message request is a SIP INVITE message, and
the service broker is adapted to change a header field of the SIP INVITE message.

10. The network of claim 9, wherein
the header field contains alert information specifying alerting or ringing tones for the subscriber's phone, and
the service broker is adapted to change the alert information header field in the SIP INVITE message to a given value to modify a presently selected ring tone or to suppress the ring tone on the subscriber's phone.

11. The network of claim 9, wherein
the header field contains alert information specifying alerting or ringing tones for the subscriber's phone, and
the service broker is adapted to set the alert information header field in the SIP INVITE message to '0' to suppress alerting of the subscriber's phone.

12. The network of claim 8, wherein the TV delivery system is an Internet Protocol Television (IPTV) supporting a browser interface to the communication network that enables the subscriber to selectively activate or suppress a function to alter the information in the message request and to display caller ID information from the communication network on a display thereof.

13. The network of claim 8, wherein
the TV delivery system is an Internet Protocol Television (IPTV) having a set top box with a client software application therein in communication with the service broker, and
the client software is adapted, via TV remote control commands from the subscriber, to selectively activate or suppress a function to alter the information in the message request and to display caller ID information from the communication network on a display thereof.

14. The network of claim 8, wherein the phone one of a SIP phone and a mobile GSM/WiFi phone registered with the network.

15. A service broker in a communication network for sharing information between applications of a communication network for a phone of the subscriber and a TV delivery system to facilitate a blending of services to be provided to a subscriber of the network and TV delivery system, wherein the service broker: executes, upon receipt of a message request from a calling party, service package information associated with services of the TV delivery system subscription to include obtaining caller ID information of the calling party, alters information in the message request to generate a modified message request, based on data of said subscriber stored in a database, and directs sending of the modified message request to the phone of the subscriber to modify alerting of the subscriber's phone, while sending the caller ID information of the calling party to an application of the TV delivery system for display.

\* \* \* \* \*